Sept. 7, 1926.
M. W. McCONKEY
1,598,975
AUTOMOBILE COLLISION BUMPER
Filed Jan. 30, 1925
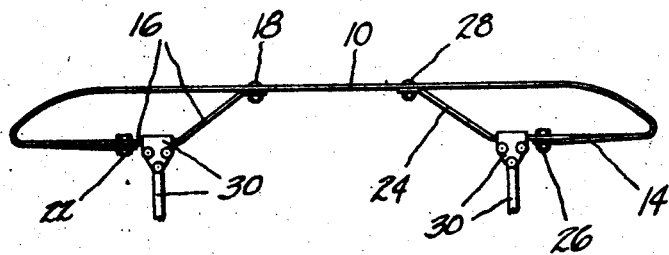
Inventor
Montgomery W. McConkey Patented Sept. 7, 1926.

1,598,975

UNITED STATES PATENT OFFICE.

MONTGOMERY W. McCONKEY, OF FERNDALE, MICHIGAN, ASSIGNOR TO GENERAL MOTORS CORPORATION, OF DETROIT, MICHIGAN, A CORPORATION OF DELAWARE.

AUTOMOBILE COLLISION BUMPER.

Application filed January 30, 1925. Serial No. 5,775.

This invention relates to collision bumpers for automobiles and has for its object the provision of a bumper which is inexpensive to manufacture and is exceedingly strong in construction. In order to reduce to a minimum the number of parts required the bumper comprises only two parts, which are substantially alike, and each consisting of a bar of spring metal bent in a short loop at one end and connected to the other bar, and bent in a longer and preferably inclined loop at the other end which is connected to the front or impact portion of the other bar. Thus the two bars are interconnected at four points without the use of special clamps or other fittings.

The above and other desirable features of construction will be apparent from the following description of one illustrative embodiment shown in the accompanying drawings, in which:

Figure 1 is a top plan view of the bumper; and

Figure 2 is a rear elevation of the bumper without the clamps for connecting it to the frame of an automobile.

As will be apparent from these figures, except for a few bolts or the like connecting devices, the bumper comprises only two parts, an upper bar 10 and a lower bar 12, which are substantially duplicates of each other but they are reversed in position with respect to each other. In the arrangement best shown in Figure 2 the bar 10 is bent around and inwardly at the right end of the bumper to form a short loop 14 and is bent around and inwardly at the left end of the bumper to form a longer loop 16, which is preferably straight in rear elevation but inclined at an acute angle with respect to the front or impact portion of the bar. The portion 16 is bent forwardly as best appears in Figure 1, and connected by a bolt or the like fastening device 18 to the front or impact portion of the bar 12.

Similarly the lower bar 12 has a short bent end 20 connected by a bolt or the like 22 to the portion 16 of the bar 10 and also has a longer looped portion 24 to which the portion 14 is secured by a bolt or the like 26 and which is secured by a similar fastening 28 to the front or impact portion of the bar 10. Suitable clamps or brackets 30 may be provided, preferably engaging the looped portions 16 and 24, to support the bumper on the chassis frame of an automobile.

While one illustrative embodiment of the invention has been described in detail, it is not my intention to limit its scope to that particular embodiment, or otherwise than by the terms of the appended claims.

I claim:

1. An automobile collision bumper comprising two vertically spaced substantially parallel impact bars adapted to extend across one end of an automobile, the opposite ends of the two bars being bent around and inwardly and each directly connected at its extreme end to the front impact portion of the opposite bar, and the other ends of the two bars being bent rearwardly and inwardly to form relatively short rear extensions each of which is connected at its extreme end to the longer end portion of the opposite bar.

2. An automobile collision bumper comprising two vertically spaced substantially parallel impact bars adapted to extend across one end of an automobile, the opposite ends of the two bars being looped backwardly and inwardly and then forwardly and bent edgewise in vertical planes in opposite directions to form looped extensions which are substantially straight when viewed in rear elevation and which extend at acute vertical angles to their respective impact portions, and each of which is connected at its extreme end to the front impact portion of the opposite bar, the opposite ends of the bars being bent backwardly and inwardly and vertically and connected to the first mentioned end portions.

3. An automobile bumper comprising, in combination vertically spaced substantially parallel impact bars, the opposite ends of the bars being bent backwardly and inwardly and then struck edgewise at the fold of the bend vertically in opposite directions to form substantially straight overlapping sections rigidly fixed to each other, the alternate opposite ends of which being somewhat longer in length than the other respective ends in order to provide angular offset ears for attachment to the body portions of the respective adjacent bars.

In testimony whereof I affix my signature.

MONTGOMERY W. McCONKEY.